US008195246B2

(12) United States Patent
Vitte et al.

(10) Patent No.: US 8,195,246 B2
(45) Date of Patent: Jun. 5, 2012

(54) OPTIMIZED METHOD OF FILTERING NON-STEADY NOISE PICKED UP BY A MULTI-MICROPHONE AUDIO DEVICE, IN PARTICULAR A "HANDS-FREE" TELEPHONE DEVICE FOR A MOTOR VEHICLE

(75) Inventors: Guillaume Vitte, Paris (FR); Julie Seris, Paris (FR); Guillaume Pinto, Paris (FR)

(73) Assignee: Parrot, Paris (FR)

( * ) Notice: Subject to any disclaimer, the term of this patent is extended or adjusted under 35 U.S.C. 154(b) by 122 days.

(21) Appl. No.: 12/840,976

(22) Filed: Jul. 21, 2010

(65) Prior Publication Data

US 2011/0070926 A1 Mar. 24, 2011

(30) Foreign Application Priority Data

Sep. 22, 2009 (FR) ..................................... 09 56506

(51) Int. Cl.
*H04B 1/38* (2006.01)

(52) U.S. Cl. ........................... 455/570; 381/92; 704/233

(58) Field of Classification Search .................... 381/17, 381/26, 57, 71.1–71.4, 71.8, 71.11, 71.12, 381/83, 86, 92, 94.2, 94.7, 99, 313, 43, 45, 381/46, 47, 48, 49, 50; 455/63.1, 67.13, 455/232.1; 704/205, 225, 226, 233, 275, 704/E15.039, E19.005, E21.002
See application file for complete search history.

(56) References Cited

U.S. PATENT DOCUMENTS

2004/0002858 A1* 1/2004 Attias et al. .................. 704/226
2007/0003074 A1* 1/2007 Ruwisch ......................... 381/92
2007/0076898 A1* 4/2007 Sarroukh et al. ................ 381/92
2008/0120100 A1* 5/2008 Takeda et al. ................. 704/233
2008/0167869 A1* 7/2008 Nakadai et al. ............... 704/233

FOREIGN PATENT DOCUMENTS

EP 1 830 349 A1 9/2007

OTHER PUBLICATIONS

Cohen, Israel et al., "Two-Channel Signal Detection and Speech Enhancement Based on the Transient Beam-To-Reference Ratio", Proceedings o International Conference on Acoustic,Speech and Signal Precessing (ICASSP 2003), IEEE 2003, pp. V-233-V-236.

(Continued)

*Primary Examiner* — Danh Le
*Assistant Examiner* — Dinh P Nguyen
(74) *Attorney, Agent, or Firm* — Havertock & Owens LLP

(57) ABSTRACT

A multi-microphone hands-free device distinguishes between non-steady noise and speech and adapts the de-noising to the presence and characteristics of the detected non-steady noise without spoiling any speech that is present. In the frequency domain, the method comprises

- calculating a first noise reference by analyzing spatial coherence of signals picked up,
- calculating a second noise reference by analyzing directions of incidence of signals picked up,
- estimating a main direction of incidence of signals picked up,
- selecting as a referent noise signal noise references as a function of estimated main direction,
- combining signals picked up into a noisy combined signal,
- calculating probability that speech is absent in the noisy combined signal on basis of respective spectral energy levels of the noisy combined signal and of the referent noise signal, and
- selectively reducing noise by applying variable gain that is specific to each frequency band and to each time frame.

7 Claims, 1 Drawing Sheet

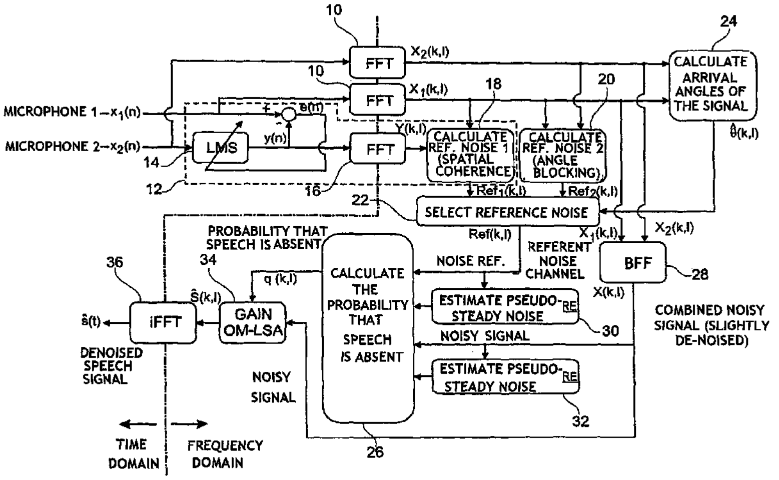

OTHER PUBLICATIONS

Low, Slow Yong et al., "Robust Michrophone Array Using Subband Adaptive Beamformer and Spectral Subtraction", Communication Systtems 2002, ICCS 2002, IEEE2002, pp. 1020-1024.

Cohen, Israel et al. "Speech Enhancement Based on Microphone Array and Log-Spectral Amplitude Estimation" , Electrical and Electronics Engineers in Israel , 2002.

Mohammed, Jafar Ramadhan, "Intelligent Method for Designing Exact Orthogonal Blocking Matrix into Robust Wideband Beamformer Using Auxiliary Sensors", Second Asian International Conference on Modeling & Simulation, IEE Computer Society, pp. 511-515.

* cited by examiner

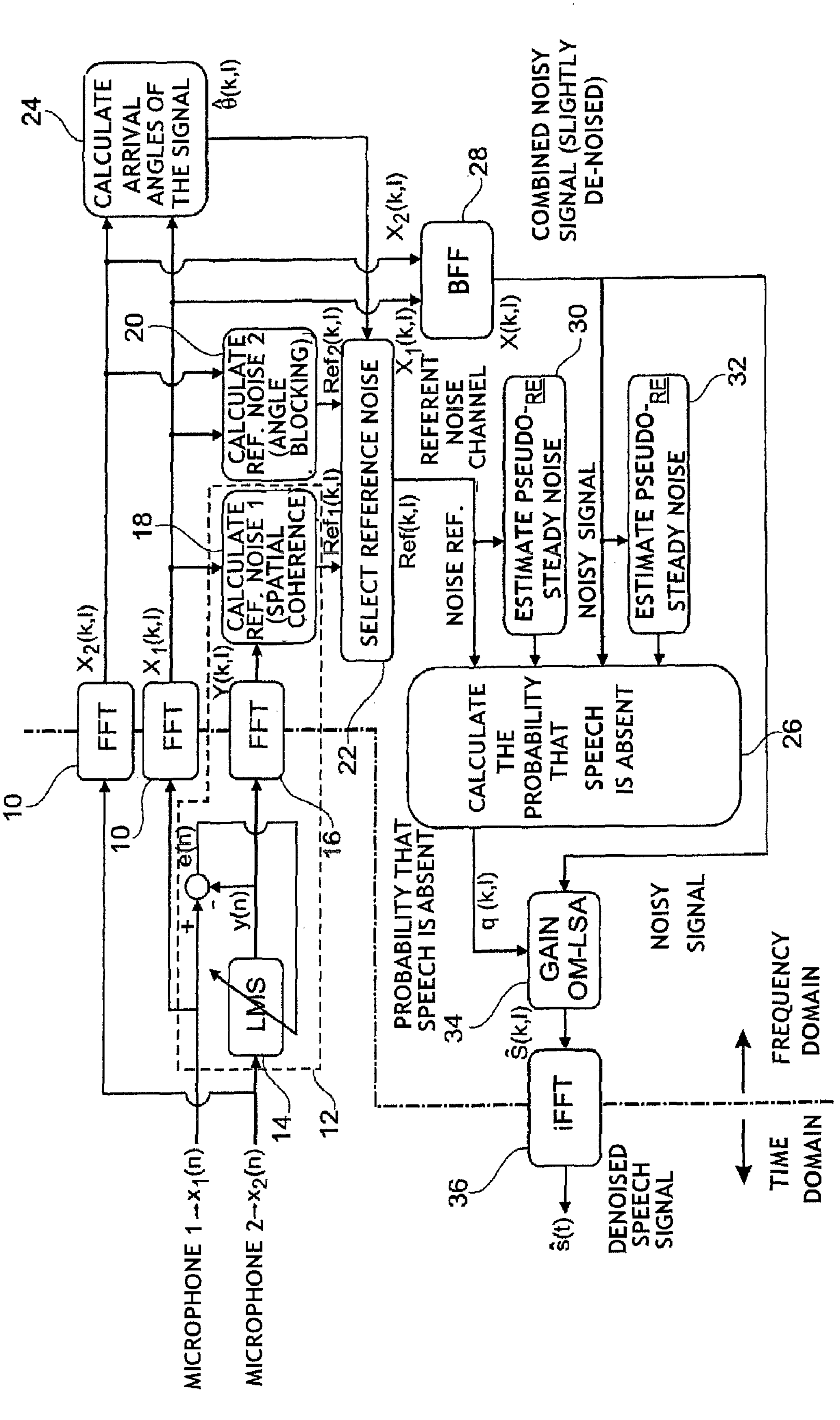
MICROPHONE 1 → x1(n)
MICROPHONE 2 → x2(n)
LMS
y(n)
e(n)
FFT
FFT
FFT
X2(k,l)
X1(k,l)
Y(k,l)
CALCULATE REF. NOISE 1 (SPATIAL COHERENCE)
CALCULATE REF. NOISE 2 (ANGLE BLOCKING)
Ref1(k,l)
Ref2(k,l)
SELECT REFERENCE NOISE
Ref(k,l)
CALCULATE ARRIVAL ANGLES OF THE SIGNAL
θ̂(k,l)
BFF
X2(k,l)
X1(k,l)
X(k,l)
COMBINED NOISY SIGNAL (SLIGHTLY DE-NOISED)
REFERENT NOISE CHANNEL
NOISE REF.
NOISY SIGNAL
ESTIMATE PSEUDO-RE STEADY NOISE
ESTIMATE PSEUDO-RE STEADY NOISE
CALCULATE THE PROBABILITY THAT SPEECH IS ABSENT
PROBABILITY THAT SPEECH IS ABSENT
q (k,l)
GAIN OM-LSA
NOISY SIGNAL
Ŝ(k,l)
iFFT
ŝ(t)
DENOISED SPEECH SIGNAL
TIME DOMAIN
FREQUENCY DOMAIN
10
10
12
14
16
18
20
22
24
26
28
30
32
34
36

OPTIMIZED METHOD OF FILTERING NON-STEADY NOISE PICKED UP BY A MULTI-MICROPHONE AUDIO DEVICE, IN PARTICULAR A "HANDS-FREE" TELEPHONE DEVICE FOR A MOTOR VEHICLE

FIELD OF THE INVENTION

The invention relates to processing speech in noisy surroundings.

The invention relates particularly, but in non-limiting manner, to processing speech signals picked up by telephone devices for motor vehicles.

BACKGROUND OF THE INVENTION

Such appliances include a sensitive microphone that picks up not only the user's voice, but also the surrounding noise, which noise constitutes a disturbing element that, under certain circumstances, can go so far as to make the speaker's speech incomprehensible. The same applies if it is desired to perform voice recognition techniques, since it is difficult to perform voice recognition for words that are buried in a high level of noise.

This difficulty, which is associated with the surrounding noise, is particularly constraining with "hands-free" devices. In particular, the large distance between the microphone and the speaker gives rise to a relatively high level of noise that makes it difficult to extract the useful signal buried in the noise.

Furthermore, the very noisy surroundings typical of the motor car environment present spectral characteristics that are not steady, i.e. that vary in unforeseeable manner as a function of driving conditions: driving over deformed surfaces or cobblestones, car radio in operation, etc.

Some such devices provide for using a plurality of microphones, generally two microphones, and they obtain a signal with a lower level of disturbances by taking the average of the signals that are picked up, or by performing other operations that are more complex. In particular, a so-called "beamforming" technique enables software means to establish directionality that improves the signal-to-noise ratio, however the performance of that technique is very limited when only two microphones are used (specifically, it is found that such a method provides good results only on the condition of having an array of eight microphones).

Furthermore, conventional techniques are adapted above all to filtering noise that is diffuse and steady, coming from around the device and occurring at comparable levels in the signals that are picked up by both of the microphones.

In contrast, noise that is not steady or "transient", i.e. that noise varies in unforeseeable manner as a function of time, is not distinguished from speech and is therefore not attenuated.

Unfortunately, in a motor car environment, such non-steady noise that is directional occurs very frequently: a horn blowing, a scooter going past, a car overtaking, etc.

A difficulty in filtering such non-steady noise stems from the fact that it presents characteristics in time and in three-dimensional space that are very close to the characteristics of speech, thus making it difficult firstly to estimate whether speech is present (given that the speaker does not speak all the time), and secondly to extract the useful speech signal from a very noisy environment such as a motor vehicle cabin.

OBJECT AND SUMMARY OF THE INVENTION

One of the objects of the present invention is to propose a multi-microphone hands-free device, in particular a system that makes use of only two microphones and that makes it possible:

- to distinguish effectively between non-steady noise and speech; and
- to adapt the de-noising to the presence of and to the characteristics of the detected non-steady noise without spoiling any speech that might also be present, so as to process the noisy signal in more effective manner.

The starting point of the invention consists in associating i) analysis of the spatial coherence of the signal picked up by the two microphones with ii) analyzing the directions of incidence of said signals. The invention relies on two observations, specifically:

- speech generally presents spatial coherence that is greater than that of noise; and also that
- the direction of incidence of speech is generally well defined, and may be assumed to be known (in a motor vehicle, it is defined as the position of the driver towards which the microphone is facing).

These two properties are used to calculate two noise references using different methods:

- a first noise reference is calculated as a function of the spatial coherence of the signals as picked up—where such a reference is advantageous insofar as it incorporates non-steady noise that is not very directional (juddering in the hum of the engine, etc.); and
- a second noise reference calculated as a function of the main direction of incidence of the signals—this characteristic can be determined when using an array of at least two microphones, giving rise to a noise reference that incorporates most particularly noise that is directional and non-steady (a horn blowing, a scooter going past, a car overtaking, etc.).

These two noise references are used in alternation depending on the nature of the noise present, and as a function of the direction of incidence of the signals:

- in general, the first noise reference (calculated using spatial coherence) is used by default;
- in contrast, when the main direction of incidence of the signal is remote from that of the useful signal (the direction of the speaker, assumed to be known a priori)—i.e. in the presence of fairly powerful directional noise—the second noise reference is used so as to incorporate therein mainly non-steady noise that is directional and powerful.

Once the noise reference has been selected in this way, the reference is used firstly to calculate a probability that speech is absent or present, and secondly to de-noise the signal picked up by the microphones.

More precisely, in general terms, the invention provides a method of de-noising a noisy sound signal picked up by two microphones of a multi-microphone audio device operating in noisy surroundings, in particular a "hands-free" telephone device for a motor vehicle.

The noisy sound signal includes a useful speech component coming from a directional speech source and an interfering noise component, the noise component itself including a lateral noise component that is not steady and directional.

By way of example, such a method is disclosed by I. Cohen and B. Berdugo in *Two-channel signal detection and speech enhancement based on the transient beam-to-reference ratio*, Proc. ICASSP 2003, Hong Kong, pp. 233-236, April 2003.

In a manner characteristic of the invention, the method comprises, in the frequency domain for a plurality of frequency bands defined for successive time frames of the signal, the following signal processing steps:

a) calculating a first noise reference by analyzing spatial coherence of signals picked up by the two microphones, this calculation comprising predictive linear filtering applied to the signals picked up by the two microphones and comprising subtraction with compensation for the phase shift between the picked-up signal and the signal output by the predictive filter;

b) calculating a second noise reference by analyzing the directions of incidence of the signals picked up by the two microphones, this calculation comprising spatial blocking of the components of picked-up signals for which the direction of incidence lies within a defined reference cone on either side of a predetermined direction of incidence of the useful signal;

c) estimating a main direction of incidence of the signals picked up by the two microphones;

d) selecting as the referent noise signal one or the other of the noise references calculated in steps a) to b), as a function of the main direction estimated in step c);

e) combining the signals picked up by the two microphones to make a noisy combined signal;

f) calculating a probability that speech is absent from the noisy combined signal on the basis of respective spectral energy levels of the noisy combined signal and of the referent noise signal; and g) on the basis of the probability that speech is absent as calculated in step f) and on the basis of the noisy combined signal, selectively reducing noise by applying variable gain that is specific to each frequency band and to each time frame.

According to various advantageous subsidiary characteristics:

- the predictive filtering comprises applying a linear prediction algorithm of the least mean squares (LMS) type;
- the estimate of the main direction of incidence in step c) comprises the following successive substeps: c1) partitioning three-dimensional space into a plurality of angular sectors; c2) for each sector, evaluating a direction of incidence estimator on the basis of the two signals picked up by the two corresponding microphones; and c3) on the basis of the values of the estimators calculated in step c2), estimating said main direction of incidence;
- the selection of step d) is selection of the second noise reference as the referent noise signal if the main direction estimated in step c) lies outside a reference cone defined on either side of a predetermined direction of incidence of the useful signal;
- the combination of step e) comprises prefiltering of the fixed beamforming type;
- the calculation of the probability that speech is absent in step f) comprises estimating the respective pseudo-steady noise components contained in the noisy combined signal and in the referent noise signal, the probability that speech is absent also being calculated from said respective pseudo-steady noise component; and
- the selective reduction of noise in step g) is processing by applying optimized modified log-spectral amplitude (OM-LSA) gain.

BRIEF DESCRIPTION OF THE DRAWINGS

There follows a description of an implementation of the method of the invention with reference to the accompanying figure.

FIG. 1 is a block diagram showing the various modules and functions implemented by the method of the invention and how they interact.

MORE DETAILED DESCRIPTION

The method of the invention is implemented by software means that can be broken down schematically as a certain number of blocks 10 to 36 as shown in FIG. 1.

The processing is implemented in the form of appropriate algorithms executed by a microcontroller or by a digital signal processor. Although for clarity of description the various processes are shown as being in the form of distinct modules, they implement elements that are common and that correspond in practice to a plurality of functions performed overall by the same software.

The signal that it is desired to de-noise comes from a plurality of signals picked up by an array of microphones (which in the minimum configuration may be an array merely of two microphones, as in the example described) arranged in a predetermined configuration. In practice, the two microphones may for example be installed under the ceiling of a car cabin, being spaced apart by about 5 centimeters (cm) from each other; and the main lobe of their radiation pattern is directed towards the driver. This direction is considered as being known a priori, and is referred to as the direction of incidence of the useful signal.

The term "lateral noise" is used to designate directional non-steady noise having a direction of incidence that is spaced apart from that of the useful signal, and the term "privileged cone" is used to designate the direction or angular sector in three dimensions relative to the array of microphones that contains the source of the useful signal (speech from the speaker). When the sound source lies outside the privileged cone, then it constitutes lateral noise, and attempts are made to attenuate it.

As shown in FIG. 1, the noisy signals picked up by the two microphones $x_1(n)$ and $x_2(n)$ are transposed into the frequency domain (blocks 10) by a short-term fast Fourier transform (FFT) giving results that are written respectively $X_1(k,l)$ and $X_2(k,l)$, where k is the index of the frequency band and l is the index of the time frame.

The signals from the two microphones are also applied to a module 12 implementing a predictive LMS algorithm represented by block 14 and producing, after calculating a short-term Fourier transform (block 16), a signal Y(k,l) that is used for calculating a first noise reference $Ref_1(k,l)$ executed by a block 18, essentially on a three-dimensional spatial coherence criterion.

Another noise reference $Ref_2(k,l)$ is calculated by a block 20, essentially on an angular blocking criterion, on the basis of the signals $X_1(k,l)$ and $X_2(k,l)$ obtained directly in the frequency domain from the signals $x_1(n)$ and $x_2(n)$.

A block 22 selects one or the other of the noise references $Ref_1(k,l)$ or $Ref_2(k,l)$ as a function of the result of the angles of incidence of the signals as calculated by the block 24 from the signals $X_1(k,l)$ and $X_2(k,l)$.

The selected noise reference, Ref(k,l), is used as a referent noise channel of a block 26 for calculating the probability of speech being absent on the basis of a noisy signal X(k,l) that results from a combination performed by the block 28 of the two signals $X_1(k,l)$ and $x_2(k,l)$. The block 26 also takes account of the respective pseudo-steady noise components of the referent noise channel and of the noisy signal, which components are estimated by the blocks 30 and 32.

The result q(k,l) of the calculated probability that speech is absent, and the noisy signal X(k,l) are applied as input to an OM-LSA gain control algorithm (block 34) and the result thereof $\hat{S}(k,l)$ is subjected in block 36 to an inverse Fourier transform (iFFT) to obtain in the time domain an estimate $\hat{s}(t)$ of the de-noised speech signal.

There follows a detailed description of each of the steps of the processing.

Fourier Transform of the Signals Picked Up by the Microphones (Blocks 10)

The signal in the time domain $x_n(t)$ from each of the N microphones (N=1, 2 in the example described) is digitized, cut up into frames of T time points, time windowed by a Hanning type window, and then the fast Fourier transform FFT (short-term transform) $X_n(k,l)$ is calculated for each of these signals:

$$X_n(k,l)=a_n \cdot d_n(k) \times S(k,l)+V_n(k,l)$$

with:

$$d_n(k)=e^{-i2\pi f_k \tau_n}$$

l being the index of the time frame;

k being the index of the frequency band; and $f_k$ being the center frequency of the frequency band of index k.

S(k,l) designating the useful signal source;

$a_n$ and $\tau_n$ designating the attenuation and the delay to which the useful signal picked up microphone n is subjected; and $V_n(k,l)$ designating the noise picked up by microphone n.

Calculating a First Noise Reference by Spatial Coherence (Block 12)

The fundamental idea on which the invention relies is that, in a telecommunications environment, speech is a signal issued by a well-localized source, relatively close to the microphones, and is picked up almost entirely via a direct path. Conversely, the steady and non-steady noise that comes above all from the surroundings of the user may be associated with sources that are far away, present in large numbers, and possessing statistical correlation between the two microphones that is less than that of the speech.

In a telecommunications environment, speech is thus spatially more coherent than is noise.

Starting from this principle, it is possible to make use of the spatial coherence property to construct a reference noise channel that is richer and better adapted than with a beamformer. For this purpose, the system makes provision to use a predictive filter 14 of the least mean squares (LMS) type having as inputs the signals $x_1(n)$ and $x_2(n)$ picked up by the pair of microphones. The LMS output is written y(n) and the prediction error is written e(n).

On the basis of $x_2(n)$, the predictive filter is used to predict the speech component that is to be found in $x_1(n)$. Since speech has greater spatial coherence than noise, it will be better predicted by the adaptive filter than will noise.

A first possibility consists in taking as the referent noise channel the Fourier transform of the prediction error:

$$E(k,l)=X_1(k,l)=-Y(k,l)$$

E(k,l), $X_1(k,l)$, and Y(k,l) being the respective short-term Fourier transforms (SIFT) of e (k,l), $x_1(k,l)$ and y (k,l).

Nevertheless, in practice it is found that there is a certain amount of phase shift between $X_1(k,l)$ and Y (k,l) due to imperfect convergence of the LMS algorithm; thereby preventing good discrimination between speech and noise.

To mitigate that defect, it is possible to define the first referent noise signal $Ref_1(k,l)$ as follows:

$$Ref_1(k,l) = X_1(k,l) - X_1(k,l)\frac{|Y(k,l)|}{|X_1(k,l)|}$$

Unlike numerous conventional noise-estimation methods, no assumption concerning the noise being steady is used in order to calculate the first reference noise channel $Ref_1(k,l)$. Consequently, one of the advantages is that this noise channel incorporates some of the non-steady noise, in particular noise that presents low statistical correlation and that is not predictable between the two microphones.

Calculation of a Second Noise Reference by Spatial Blocking (Block 20)

In a telecommunications environment, it is possible to encounter noise from a source that is well-localized and relatively close to the microphones. In general this noise is of short duration and quite loud (a scooter going past, being overtaken by a car, etc.) and it may be troublesome.

The assumptions used for calculating the first referent noise channel do not apply with this type of noise; in contrast, this type of noise has the feature of possessing a direction of incidence that is well-defined and different from the direction of incidence of speech.

In order to take advantage of this property, it is assumed that the angle of incidence $\theta_s$ of speech is known, e.g. being defined as the angle between the perpendicular bisector of the pair of microphones and the reference direction corresponding to the useful speech source.

More precisely, three-dimensional space is partitioned into angular sectors that describe said space, each of which corresponds to a direction defined by an angle $\theta_j$, $j \in [1, M]$, e.g. with M=19, giving the following collection of angles {−90°, −80° . . . , 0°, . . . +80°, +90°}. It should be observed that there is no connection between the number N of microphones and the number M of angles tested: for example, it is entirely possible to test M=19 angles using only one pair of microphones (N=2).

The angles $\theta_j$ are partitioned {A,I} respectively as "authorized" and as "forbidden", where the angles $\theta_a \in A$ are "authorized" in that they correspond to signals coming from a privileged cone centered on $\theta_s$, while the angles $\theta_i \in I$ are "forbidden" in that they correspond to undesirable lateral noise.

The second referent noise channel $Ref_2(k,l)$ is defined as follows:

$$Ref_2(k,l) = \frac{1}{|A|}\sum_{\theta_a \in A}\left(X_1(k,l) - X_2(k,l) \times e^{\frac{i2\pi \cdot f_k \cdot d \cdot \sin\theta_a}{c}}\right)$$

$X_1(k,l)$ being the STFT of the signal picked up by the microphone of index 1;

$X_2(k,l)$ being the STFT of the signal picked up by the microphone of index 2;

$f_k$ being the center frequency of the frequency band θ;

l being the frame;

d being the distance between the two microphones;

c being the speed of sound; and

|A| being the number of "authorized" angles in the privileged cone.

In each term of this sum, the signal from the microphone of index 2, phase-shifted by an angle $\theta_a$, and forming part of A (subcollection of "authorized" angles) is subtracted from the signal from the microphone of index 1. Thus, in each term, signals having an "authorized" propagation direction $\theta_a$ are blocked spatially. This spatial blocking is performed for all authorized angles.

In the second referent noise channel $Ref_2(k,l)$ any lateral noise is therefore allowed to pass (i.e. any directional non-stationary noise), while the speech signal is spatially blocked.

Choice of the Noise Reference as a Function of the Angle of Incidence of the Signals (Blocks 22 and 24)

This selection involves estimating the angle of incidence $\hat{\theta}(k,l)$ of the signals.

This estimator (block 24) may for example rely on a cross-correlation calculation taking as the direction of incidence the angle that maximizes the modulus of the estimator, i.e.:

$$\hat{\theta}(k,l) = \underset{\theta_j, j\in[1,M]}{\operatorname{argmax}} \|P_{1,2}(\theta_j, k, l)\|$$

with:

$$P_{1,2}(\theta_j,k,l)=E(X_1(k,l)\cdot\overline{X}_2(k,l)\cdot e^{-i2\pi f_k \tau_j})$$

and $$\tau_j = \frac{d}{c}\sin\theta_j$$

The selected referent noise channel Ref(k,l) will depend on detecting an "authorized" or "forbidden" angle for frame l and frequency band k:

if $\hat{\theta}(k,l)$ is "authorized" ($\hat{\theta}(k,l)\in A$), then $Ref(k,l)=Ref_1(k,l)$;

if $\hat{\theta}(k,l)$ is "forbidden" ($\hat{\theta}(k,l)\in A$), then $Ref(k,l)=Ref_1(k,l)$;

if $\hat{\theta}(k,l)$ is not defined, then $Ref(k,l)=Ref_1(k,l)$.

Thus, when an "authorized" angle is detected, or when there are no directional signals input to the microphones, then the referent noise channel Ref(k,l) is calculated by spatial coherence, thus enabling non-steady noise that is not very directional to be incorporated.

In contrast, if a "forbidden" angle is detected, that means that quite powerful directional noise is present. Under such circumstances, the referent noise channel Ref(k,l) is calculated using a different method, by spatial blocking, so as to be effective in introducing non-steady noise that is directional and powerful into this channel.

Construction of a Partially De-Noised Combined Signal (Block 28)

The signals $X_n(k,l)$ (the STFTs of the signals picked up by the microphones) may be combined with each other using a simple prefiltering technique by delay and sum type beamforming, which is applied to obtain a partially de-noised combined signal X(k,l):

$$X(k,l) = \frac{1}{2}[X_1(k,l) + \overline{d_2(k)}\cdot X_2(k,l)]$$

with:

$$d_2(k) = e^{i2\pi f_k \tau_s} \text{ with } \tau_s = \frac{d}{c}\sin\theta_s$$

When, as in the present example, the system under consideration has two microphones with their perpendicular bisector intersecting the source, the angle $\theta_s$ is zero and a simple mean is taken from the two microphones. Specifically, it should also be observed that since the number of microphones is limited, this processing produces only a small improvement in the signal-to-noise ratio, of the order of only 1 decibel (dB).

Estimating the Pseudo-Steady Noise (Blocks 30 and 32)

The purpose of this step is to calculate and estimate for the pseudo-steady noise component present in the noise reference Ref(k,l) (block 30) and in the same manner the pseudo-steady noise component present in the signal for de-noising X(k,l) (block 32).

Very many publications exist on this topic, since estimating the pseudo-steady noise component is a well-known problem that is quite well resolved. Various methods are effective and usable for this purpose, in particular an algorithm for estimating the energy of the pseudo-steady noise by minima controlled recursive averaging (MCRA), such as that described by I. Cohen and B. Berdugo in *Noise estimation by minima controlled recursive averaging for robust speech enhancement*, IEEE Signal Processing Letters, Vol. 9, No. 1, pp. 12-15, January 2002.

Calculating the Probability that Speech is Absent (Block 26)

An effective method known for estimating the probability that speech is absent in a noisy environment is the transient ratio method as described by I. Cohen and B. Berdugo in *Two-channel signal detection and speech enhancement based on the transient beam-to-reference ratio*, Proc. ICASSP 2003, Hong Kong, pp. 233-236, April 2003.

The transient ratio is defined as follows:

$$\Omega(k,l) = \frac{S[X(k,l)] - M[X(k,l)]}{S[Ref(k,l)] - M[Ref(k,l)]}$$

X(k,l) being the partially de-noised combined signal;

Ref(k,l) being the referent noise channel calculated in the preceding portion;

k being the frequency band; and l being the frame.

The operator S is an estimate of the instantaneous energy, and the operator M is an estimate of the pseudo-steady energy (estimation performed by the blocks 30 and 32). S−M provides an estimate of the transient portions of the signal under analysis, also referred to as the transients.

The two signals analyzed here are the combined noisy signal X(k,l) and the signal from the referent noise channel Ref(k,l). The numerator therefore shows up speech and noise transients, while the denominator extracts only those noise transients that lie in the referent noise channel.

Thus, in the presence of speech but in the absence of non-steady noise, the ratio $\Omega(k,l)$ will tend towards an upper limit $\Omega_{max}(k)$, whereas conversely, in the absence of speech but in the presence of non-steady noise, the ratio will approach a lower limit $\Omega_{min}(k)$, where k is the frequency band. This makes it possible to distinguish between speech and non-steady noise.

In the general case, the following applies:

$$\Omega_{min}(k) \leqq \Omega(k,l) \leqq \Omega_{max}(k)$$

The probability of speech being absent, here written q(k,l), is calculated as follows.

For each frame l and each frequency band k:

i) Calculate S[X(k,l)], S[Ref(k,l)], M[X(k,l)], and M[Ref(k, l)];

ii) If $S[X(k,l)] \geqq \alpha_X M[X(k,l)]$, speech might be present, and analysis continues in step iii); otherwise speech is absent: i.e. q(k,l)=1;

iii) If $S[Ref(k,l)] \leqq \alpha_{Ref} M[Ref(k,l)]$, transient noise might be present, and analysis continues in step iv); otherwise this means that the transients found in X(k,l) are all speech transients: i.e. q(k,l)=0;

iv) Calculate the ratio $$\Omega(k,l) = \frac{S[X(k,l)] - M[X(k,l)]}{S[Ref(k,l)] - M[Ref(k,l)]};$$

v) Determine the probability that speech is absent:

$$q(k,l) = \max\left(\min\left(\frac{\Omega_{max}(k,l) - \Omega(k,l)}{\Omega_{max}(k,l) - \Omega_{min}(k,l)}, 1\right), 0\right)$$

The constants $\alpha_X$ and $\alpha_{Ref}$ used in this algorithm are detection thresholds for transient portions. The parameters $\alpha_X$, $\alpha_{Ref}$ and also $\Omega_{min}(k)$ and $\Omega_{max}(k)$ are all selected so as to correspond to situations that are typical, being close to reality.

Reducing Noise by Applying OM-LSA Gain (Block 34)

The probability q(k,l) that speech is absent as calculated in block 26 is used as an input parameter in a de-noising technique that is itself known. It presents the advantage of making it possible to identify periods in which speech is absent even in the presence of non-steady noise that is not very directional or that is directional. The probability that speech is absent is a crucial estimator for proper operation of a de-noising structure of the kind used, since it underpins a good estimate of the noise and an effective calculation of de-noising gain.

It is advantageous to use a de-noising method of the optimally modified log-spectral amplitude (OM-LSA) type such as that described by I. Cohen, *Optimal speech enhancement under signal presence uncertainty using log-spectral amplitude estimator*, IEEE Signal Processing Letters, Vol. 9, No. 4, April 2002.

Essentially, the application of so-called "log-spectral amplitude" (LSA) gain serves to minimize the mean square distance between the logarithm of the amplitude of the estimated signal and the algorithm of the amplitude of the original speech signal. This second criterion is found to be better than the first since the selected distance is a better match with the behavior of the human ear, and thus gives results that are qualitatively superior. Under all circumstances, the essential idea is to reduce the energy of frequency components that are very noisy by applying low gain to them while leaving intact frequency components suffering little or no noise (by applying gain equal to 1 to them).

The OM-LSA algorithm improves the calculation of the LSA gain to be applied by weighting the conditional probability of speech being present.

In this method, the probability of speech being absent is involved at two important moments, for estimating the noise energy and for calculating the final gain, and the probability q(k,l) is used on both of these occasions.

If the estimated power spectrum density of the noise is written $\hat{\lambda}_{Noise}(k,l)$, then this estimate is given by:

$$\hat{\lambda}_{Noise}(k,l) = \alpha_{Noise}(k,l) \cdot \hat{\lambda}_{Noise}(k,l-1) + [1-\alpha_{Noise}(k,l)] \cdot |X(k,l)|^2$$

with:

$$\alpha_{Noise}(k,l) = \alpha_B + (1-\alpha_B) \cdot p_{spa}(k,l)$$

It should be observed here that the probability q(k,l) modulates the forgetting factor in estimating noise, which is updated more quickly concerning the noisy signal X(k,l) when the probability of no speech is high, with this mechanism completely conditioning the quality of $\hat{\lambda}_{Noise}(k,l)$.

The de-noising gain $G_{OM\text{-}LSA}(k,l)$ is given by:

$$G_{OM\text{-}LSA}(k,l) = \{G_{H1}(k,l)\}^{1-q(k,l)} \cdot G_{min}{}^{q(k,l)}$$

$G_{H1}(k,l)$ being the de-noising gain (which is calculated as a function of the noise estimate $\hat{\lambda}_{Noise}$) described in the above-mentioned article by Cohen; and $G_{min}$ being a constant corresponding to the de-noising applied when speech is considered as being absent.

It should be observed that the probability q(k,l) here plays a major role in determining the gain $G_{OM\text{-}LSA}(k,l)$. In particular, when this probability is zero, the gain is equal to $G_{min}$ and maximum noise reduction is applied: for example, if a value of 20 dB is selected for $G_{min}$, then previously-detected non-steady noise is attenuated by 20 dB.

The de-noised signal $\hat{S}(k,l)$ output by the block 34 is given by:

$$\hat{S}(k,l) = G_{OM\text{-}LSA}(k,l) \cdot X(k,l)$$

It should be observed that such a de-noising structure usually produces a result that is unnatural and aggressive on non-steady noise, which is confused with useful speech. One of the major advantages of the present invention is that it is effective in eliminating such non-steady noise.

Furthermore, in an advantageous variant, it is possible in the expressions given above to use a hybrid probability $q_{hybrid}(k,l)$ that speech is absent, which probability is calculated using q(k,l) and some other probability $q_{std}(k,l)$ that speech is absent, e.g. as evaluated using the method described in WO 2007/099222 A1 (Parrot SA). This gives:

$$q_{hybrid}(k,l) = \max(q(k,l), q_{std}(k,l))$$

Time Reconstruction of the Signal (Block 36)

A last step consists in applying an inverse fast Fourier transform (iFFT) to the signal $\hat{S}(k,l)$ in order to obtain the looked-for de-noised speech signal $\hat{s}(t)$ in the time domain.

What is claimed is:

1. A method of de-noising a noisy sound signal picked up by two microphones of a multi-microphone audio device operating in noisy surroundings, in particular a "hands-free" telephone device for a motor vehicle, the noisy sound signal comprising a useful speech component coming from a directional speech source and an unwanted noise component, the noise component itself including a non-steady lateral noise component that is directional, comprising, in the frequency domain for a plurality of frequency bands defined for successive time frames of the signal, the following signal processing steps:

a) calculating a first noise reference by analyzing spatial coherence of signals picked up by the two microphones, this calculation comprising predictive linear filtering applied to the signals picked up by the two microphones and comprising subtraction with compensation for the phase shift between the picked-up signal and the signal output by the predictive filter;

b) calculating a second noise reference by analyzing the directions of incidence of the signals picked up by the two microphones, this calculation comprising spatial blocking of the components of picked-up signals for which the direction of incidence lies within a defined reference cone on either side of a predetermined direction of incidence of the useful signal;

c) estimating a main direction of incidence of the signals picked up by the two microphones;

d) selecting as the referent noise signal one or the other of the noise references calculated in steps a) to b), as a function of the main direction estimated in step c);

e) combining the signals picked up by the two microphones to make a noisy combined signal;

f) calculating a probability that speech is absent from the noisy combined signal on the basis of respective spectral energy levels of the noisy combined signal and of the referent noise signal; and g) on the basis of the probability that speech is absent as calculated in step f) and on the basis of the noisy combined signal, selectively reducing noise by applying variable gain that is specific to each frequency band and to each time frame.

2. The method of claim 1, wherein the predictive filtering comprises applying a linear prediction algorithm of the least mean squares type.

3. The method of claim 1, wherein the estimate of the main direction of incidence in step c) comprises the following successive substeps:

c1) partitioning three-dimensional space into a plurality of angular sectors;

c2) for each sector, evaluating a direction of incidence estimator on the basis of the two signals picked up by the two corresponding microphones; and c3) on the basis of the values of the estimators calculated in step c2), estimating said main direction of incidence.

4. The method of claim 1, wherein the selection of step d) is selection of the second noise reference as the referent noise signal if the main direction estimated in step c) lies outside a reference cone defined on either side of a predetermined direction of incidence of the useful signal.

5. The method of claim 1, wherein the combination of step e) comprises prefiltering of the fixed beamforming type.

6. The method of claim 1, wherein the calculation of the probability that speech is absent in step f) comprises estimating the respective pseudo-steady noise components contained in the noisy combined signal and in the referent noise signal, the probability that speech is absent also being calculated from said respective pseudo-steady noise component.

7. The method of claim 1, wherein the selective reduction of noise in step g) is processing by applying optimized modified log-spectral amplitude gain.

* * * * *